Dec. 1, 1953     L. ISACHSEN     2,661,185
ROLLER HOUSING WITH LINE REEVING ARRANGEMENT
Filed Nov. 24, 1950
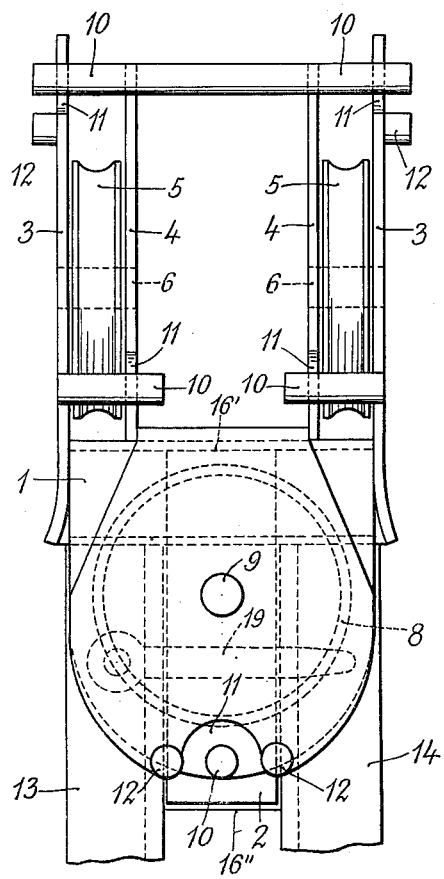
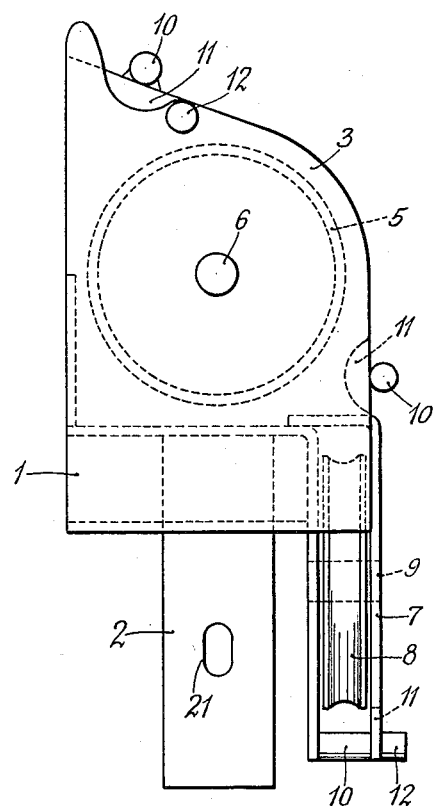
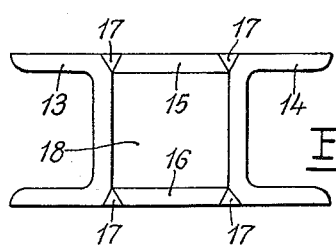
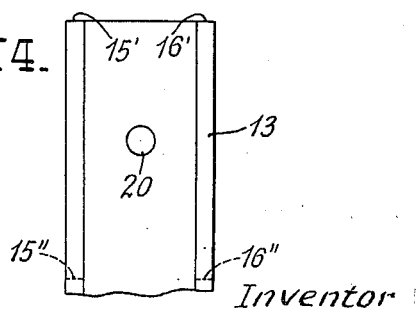
Inventor
Ludvik Isachsen
By
Atty.

UNITED STATES PATENT OFFICE 2,661,185

ROLLER HOUSING WITH LINE REEVING ARRANGEMENT

Ludvik Isachsen, Larvik, Norway

Application November 24, 1950, Serial No. 197,228

Claims priority, application Norway December 1, 1949

3 Claims. (Cl. 254—193)

The present invention relates to hoisting apparatus for vehicles, particularly automobiles with trailer.

In order to be able to load the trailer separately by devices of this kind the hoisting lines must be removed from the stakes of the automobile and be passed to the stakes of the trailer. This is a time-wasting and tedious work and requires many guiding means, or the stakes must be provided with extra guiding rollers, so that the hoisting means may be passed from the top of the stakes of the automobile to the lower ends of the stakes of the trailer and from same to their upper end, from which they are passed to the load to be hoisted.

The present invention relates to a device in which the guiding of the hoisting line is simplified so that it may be passed directly from the top of the automobile stake to the top of the trailer stake, regardless of the side of the vehicle on which the stake is located and without threading the hoisting line through holes or the like.

This is accomplished according to the invention by means of a roller housing secured in the upper end of the stake and wherein two parallel rollers are arranged upon trunnions directed in the longitudinal direction of the vehicle and with a mutual distance suitable for a third roller which is turnable about an axis directed in the transverse direction of the vehicle and arranged under and to the side of the first mentioned two rollers in such a manner that a hoisting line passed around the lower roller may be passed, according to its direction, over one or the other one of the two overlying rollers.

An embodiment of the invention is shown in the drawing in which:

Fig. 1 is a side elevation of the roller housing;

Fig. 2 is an end elevation thereof;

Fig. 3 is a top plan view of one of the stakes;

Fig. 4 is a detail view of the upper portion of a stake adapted to receive the lower pin of the housing.

In the drawing, 1 denotes the lower portion of the roller housing, to which is secured a downwardly directed pin 2 adapted to be passed down into the upper end of the hollow stake as shown in Fig. 1. By this arrangement the roller housing may be shifted from one vehicle stake to the other one according to the requirement. The housing may be releasably connected with the stakes in any suitable manner.

For this purpose the stakes may be made of two parallel U-beams 13, 14 as shown in Fig. 3, and at the upper end between the two beams two plates 15, 16 are welded fast, whose upper and lower edges are located at 16' and 16'' respectively as indicated in Figs. 1 and 4. 17 are the welding grooves for these plates 15, 16. In this manner each stake 13, 14 presents uppermost a square vertical passage 18 (see Fig. 3), into which the pin 2 may be inserted and fastened by a transverse pin 19 (Fig. 1) passed through holes 20 (Fig. 4) in the two beams 13, 14 and a short slot 21 in the pin 2.

To the lower portion 1 of the housing two vertical side walls 3 are attached and inside each of them a similar wall 4 is arranged. Between the walls 3 and 4 rope rollers 5 are arranged which are turnable about trunnions 6. These are preferably arranged on a common horizontal axis, which in the operating position of the housing upon the stake is parallel with the longitudinal direction of the vehicle.

At the exterior side of the lower portion 1 two downwardly projecting walls 7 are arranged, between which a roller 8 is turnable about a trunnion 9. The roller 8 is consequently turnable about an axis, which is perpendicular to the rotating axis of the rollers 5 and is placed symmetrically between and to the side of the same in such a position, that a rope passed around the roller 8, may be passed over one or the other one of the rollers 5.

In the construction described above of the roller housing a hoisting rope may be passed into same from any of the sides.

In order to prevent the hoisting line, when used, from falling off from the rollers, the walls 3, 4 and 7 respectively project outside the circumference of the rollers, and across the intermediate space between the separate wall-pairs transverse pieces 10 are arranged which prevent the hoisting rope from being passed unintentionally out from the said intermediate space.

In order to be able to pass a bight of the hoisting rope around the respective rollers, so that a threading-in of an end thereof may be prevented, the transverse pieces 10 are only attached to one of the respective wall pairs, the opposite wall in said pair having a recess 11 which makes it possible to pass the hoisting rope from the side under the pieces 10 to the roller. In order to facilitate the bending of the rope during such passing in position pin-like or knob-shaped projections 12 may be arranged at one or both sides of the lateral recesses 11. For the same purpose the transverse pieces 10 project somewhat beyond the wall provided with the recess as shown.

The roller housing described above may be arranged upon the stake of a trailer at any side of the same, and the hoisting rope may be passed directly from the top of the automobile stake to the roller housing, wherein a bight of the rope may be passed around the rollers 8, 5 by being passed in through the recesses 11, and the rope, after having been placed in position, can not get free unintentionally from the rollers when used.

I claim:

1. A hoisting device for trucks and trailers or the like, comprising a roller housing, two spaced rollers mounted to rotate about a common axis, said housing including two pairs of side walls, one of said walls being disposed on each side of and adjacent each of said rollers to retain the hoisting cable thereon, a third roller mounted to rotate about an axis perpendicular to the first mentioned axis, said third roller being disposed below and symmetrical with said first rollers with its diametrically opposed peripheral edges aligned with the peripheral edges of said first rollers so that a hoisting line may be passed from said third roller to either of said first rollers depending upon the direction of feed, retaining means for confining the hoisting line to said rollers, said retaining means comprising cross rods arranged between the walls of each pair, one end of each of said rods being secured to one wall of each pair and the other end thereof projecting somewhat beyond the opposite wall of each pair, said last wall of each pair having an opening adjacent the last mentioned end of said cross rod to provide clearance for bending the hoisting line into place.

2. A device as set forth in claim 1, in which the roller housing is provided with a knob-shaped projection adjacent said side openings to facilitate bending said line into place.

3. A device as set forth in claim 1, in which the roller housing at the under side is provided with a pin having quadratic cross section by which it may be fastened releasably to the upper end of a stake.

LUDVIK ISACHSEN.

References Cited in the file of this patent

UNITED STATES PATENTS

| Number | Name | Date |
|---|---|---|
| 862,460 | Ferris | Aug. 6, 1907 |
| 1,317,662 | Foster | Sept. 30, 1919 |
| 1,817,949 | Smith | Aug. 11, 1931 |
| 1,955,942 | Bush | Apr. 24, 1934 |
| 2,006,388 | Ellis | July 2, 1935 |
| 2,283,576 | Robinson | May 19, 1942 |
| 2,497,900 | Mork et al. | Feb. 21, 1950 |